US006987752B1

(12) United States Patent
Sarraf et al.

(10) Patent No.: US 6,987,752 B1
(45) Date of Patent: Jan. 17, 2006

(54) METHOD AND APPARATUS FOR FREQUENCY OFFSET ESTIMATION AND INTERLEAVER SYNCHRONIZATION USING PERIODIC SIGNATURE SEQUENCES

(75) Inventors: Mohsen Sarraf, Rumson, NJ (US); Mohammad Hossein Zarrabizadeh, Woodbridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/396,055

(22) Filed: Sep. 15, 1999

(51) Int. Cl.
    *H04J 1/00* (2006.01)
(52) U.S. Cl. .............. 370/343; 370/324; 370/292; 455/502; 455/403
(58) Field of Classification Search .......... 370/343, 370/480, 485, 516, 491, 498, 208, 203, 209, 370/324, 338, 260, 487, 310, 319, 330, 481, 370/292, 204, 205, 210, 344, 436, 478; 455/403, 455/575.1, 550.1, 456.5, 456.6, 424, 425, 455/422.1, 450, 436, 435.3, 426.1, 426.2, 455/422, 423, 444, 447, 452.1, 454, 455, 455/464, 10, 42, 45, 46, 500, 502, 504, 506, 455/509, 512, 517, 516, 515, 524, 525, 62, 455/63.3, 63.1, 65, 67.13, 561.95, 101, 102, 455/103, 293, 312; 375/350, 369, 346, 354, 375/148, 240, 284, 316, 510, 522
See application file for complete search history.

(56) References Cited

U.S. PATENT DOCUMENTS

| 4,483,011 A | * | 11/1984 | Brown | 375/25 |
| 5,428,647 A | * | 6/1995 | Rasky et al. | 375/366 |
| 5,504,783 A | * | 4/1996 | Tomisato et al. | 375/267 |
| 5,652,772 A | * | 7/1997 | Isaksson et al. | 375/367 |
| 5,732,113 A | * | 3/1998 | Schmidl et al. | 375/355 |
| 6,104,333 A | * | 8/2000 | Wood, Jr. | 341/173 |
| 6,151,369 A | * | 11/2000 | Ohkubo et al. | 375/332 |
| 6,160,791 A | * | 12/2000 | Bohnke | 370/208 |
| 6,226,337 B1 | * | 5/2001 | Klank et al. | 375/367 |

(Continued)

*Primary Examiner*—Edward F. Urban
*Assistant Examiner*—Charles Chow

(57) ABSTRACT

A method and apparatus are disclosed for frequency offset estimation and interleaver synchronization, using periodic signature sequences, such as Barker codes. The periodic signature sequence is used for interleaver synchronization or frequency offset estimation or both. The periodic signature sequence is transmitted over a certain number of bins in both the upper and lower sides of the DAB signal. Since the signature sequences are assigned to specific bins known to the receiver, any shift of the correlated peak from the expected location due to frequency offset errors can be estimated by the frequency offset algorithm. If the Barker sequence is placed, for example, in the last column of the DAB interleaver, the location of the Barker sequence upon correlation of the received digital signal identifies the beginning of an interleaver block. A Barker sequence is transmitted over a signature frame every L data frames on each side band, where L is generally the number of OFDM frames that can fill the interleaver memory. If the maximum frequency offset is M, then the frequency offset algorithm utilizes a search window of size n+2M (between bins N−M through N+n+M), and attempts to maintain the Barker sequence in the center of the search window. At the receiver, the Barker sequence is mapped to the OFDM signature bins that do not belong to uncertainty regions (the group of bins that can fall out of the receiver processing range for maximum positive and negative frequency offset values). Thus, the Barker sequence bins are processed by the disclosed receiver as long as the frequency offset does not exceed the specified maximum frequency offset.

30 Claims, 3 Drawing Sheets

U.S. PATENT DOCUMENTS

| | | | |
|---|---|---|---|
| 6,307,868 B1 * | 10/2001 | Rakib et al. | 370/485 |
| 6,363,084 B1 * | 3/2002 | Dejonghe | 370/480 |
| 6,381,251 B1 * | 4/2002 | Sano et al. | 370/480 |
| 6,404,732 B1 * | 6/2002 | van Nee | 370/209 |
| 6,411,664 B1 * | 6/2002 | Usui et al. | 375/343 |
| 6,442,211 B1 | 8/2002 | Hampel et al. | |
| 6,487,252 B1 * | 11/2002 | Kleider et al. | 375/260 |
| 2002/0031081 A1 * | 3/2002 | Valtolina et al. | 370/203 |

* cited by examiner

METHOD AND APPARATUS FOR FREQUENCY OFFSET ESTIMATION AND INTERLEAVER SYNCHRONIZATION USING PERIODIC SIGNATURE SEQUENCES

CROSS REFERENCE TO RELATED APPLICATIONS

The present invention is related to U.S. patent application Ser. No. 09/396,058, entitled "Method And Apparatus For Partial And Course Frequency Offset Estimation In A Digital Audio Broadcasting (DAB) System," filed contemporaneously herewith, assigned to the assignee of the present invention and incorporated by reference herein.

FIELD OF THE INVENTION

The present invention relates generally to digital audio broadcasting and other types of digital communication systems, and more particularly, to frequency offset estimation techniques for such digital audio broadcasting and other types of digital communication systems.

BACKGROUND OF THE INVENTION

Proposed systems for providing digital audio broadcasting in the FM radio band are expected to provide near CD-quality audio, data services and more robust coverage than existing analog FM transmissions. However, until such time as a transition to all-digital DAB can be achieved, many broadcasters require an intermediate solution in which the analog and digital signals can be transmitted simultaneously within the same licensed band. Such systems are typically referred to as hybrid in-band on-channel (HIBOC) DAB systems, and are being developed for both the FM and AM radio bands.

In order to prevent significant distortion in conventional analog FM receivers, the digital signal in a typical FM HIBOC DAB system is, for example, transmitted in two side bands, one on either side of the analog FM host signal, using orthogonal frequency division multiplexing (OFDM) sub-carriers. In an OFDM communication system, the digital signal is modulated to a plurality of small sub-carrier frequencies that are then transmitted in parallel.

In the United States, the frequency plan established by current FCC regulations separates each transmitting station in a geographical area by 800 KHz. Any transmitting stations in adjacent geographical areas, however, are separated from a local transmitting station by only 200 KHz. Thus, a particularly significant source of interference in such a system is known as first adjacent analog FM interference. This interference results when a portion of an FM host carrier in an adjacent geographic area overlaps in frequency with a portion of a digital signal side band. Although first adjacent analog FM interference, when present, typically affects only one of the two digital side bands, it nonetheless represents a limiting factor on the performance of DAB systems. The presence of a strong first adjacent interference signal will significantly degrade the performance of the digital signal transmissions, even when one of the two side bands is free from interference.

Frequency offset estimation techniques are implemented in most communication systems. In most digital communication systems, a frequency error is calculated using information in the time domain, and feedback is provided to correct the error. Time domain operation in the IBOC case, however, is significantly impacted by in-band power from adjacent channels due to first adjacent interference. In addition, timing errors in the time domain operation are coupled to the frequency error calculation in an OFDM system.

A need therefore exists for a frequency offset estimation technique that provides reliable performance, even in presence of first adjacent interference. A further need exists for a method and apparatus that performs frequency offset estimation techniques in the frequency domain.

SUMMARY OF THE INVENTION

Generally, a method and apparatus are disclosed for frequency offset estimation and interleaver synchronization, using periodic signature sequences, such as Barker codes. According to one aspect of the invention, the periodic signature sequence is used for interleaver synchronization or frequency offset estimation or both. The periodic signature sequence, such as a Barker code with a very low side-lobe, is transmitted over a certain number of bins in a DAB system in both the upper and lower sides of the DAB signal. Since the signature sequences are assigned to specific bins known to the receiver, any shift of the correlated peak from the expected location due to frequency offset errors can be estimated by the frequency offset algorithm. The estimated frequency offset can then be corrected using feedback techniques. If the Barker sequence is placed, for example, in the last column of the DAB interleaver, the location of the Barker sequence upon correlation of the received digital signal identifies the beginning of an interleaver block.

The disclosed FM HIBOC DAB system transmits a Barker sequence over a signature frame every L data frames on each side band, where L is generally the number of OFDM frames that can fill the interleaver memory. In one implementation, the transmission of the signature sequence on one side band is delayed from the other by L/2 data frames for diversity purposes.

The n consecutive bins that carry the Barker sequence are referred to as the signature bins and the OFDM frames that contain the signature bins are referred to as signature frames. If the maximum frequency offset is M bin separation intervals, then the frequency offset algorithm utilizes a search window of size n+2M bin separation intervals, and attempts to maintain the Barker sequence in the center of the search window. At the transmitter, the Barker sequence is mapped to the OFDM signature bins that do not belong to uncertainty regions (the group of bins that can fall out of the receiver processing range for maximum positive and negative frequency offset values). Thus, the Barker sequence bins are processed by the disclosed receiver as long as the frequency offset does not exceed the specified maximum frequency offset.

The receiver processes the FFT outputs N−M to N+n+M and −N+M to −N−n−M, that correspond to the upper and lower uncertainty regions of the signature bins, respectively, in the absence of any frequency offset. If the received frequency domain signal is shifted by a frequency offset equal to an integer multiple of the frame rate before the FFT operation, this frequency shift in frequency domain is translated to a time shift by an integer number of symbols at the FFT output.

While processing a signature frame (every L frames), the Barker matched filter, having the length of 2n−1, will produce a peak upon the arrival of the 2(N+n)'th demodulated bit and 2(−N−n)'th demodulated bit in the absence of any frequency offset. For a frequency offset of ±ΔN bins, the auto-correlation peak will be shifted from this reference bit to the 2(±N±n±ΔN)'th bit position. Any shift from this reference bit is calculated and the corresponding frequency offset is determined by the receiver.

A more complete understanding of the present invention, as well as further features and advantages of the present invention, will be obtained by reference to the following detailed description and drawings.

DETAILED DESCRIPTION

Figure 1:
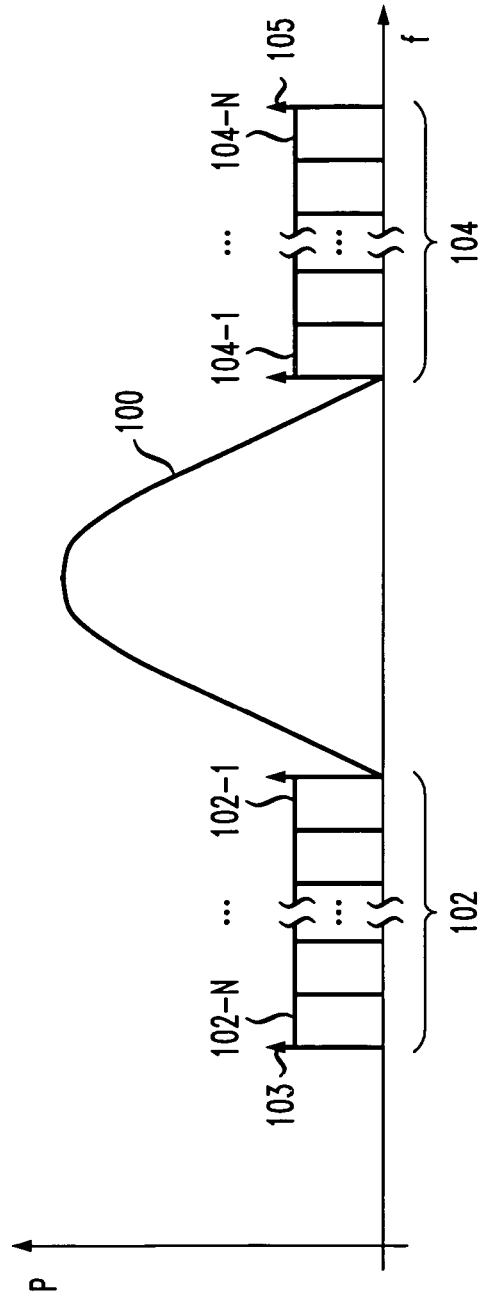
FIG. 1 shows a portion of a frequency spectrum in an exemplary hybrid in-band on-channel digital audio broadcasting system in accordance with the present invention.

FIG. 1 illustrates a portion of a frequency spectrum in an exemplary FM HIBOC DAB system, plotted with the power, P, as a function of frequency, $f$. The portion of the spectrum shown in FIG. 1 includes an analog host FM signal 100 with associated lower digital side band 102 and upper digital side band 104. The side bands represent portions of the frequency spectrum used to transmit digital audio information in the HIBOC DAB system.

The system in the illustrative embodiment, discussed further below, uses an inner cyclic redundancy code (CRC), and differential quadrature phase shift keyed (DQPSK)/OFDM modulation. The DQPSK modulation of transmitted symbols provides robustness to frequency-selective fading and oscillator phase drift. The differential encoding is performed in frequency between OFDM tones. The digital signal to be transmitted and the inner CRC block code are repeated in each of the side bands 102, 104. As shown in FIG. 1, each of the side bands include N components, 102-1 through 102-N, and 104-1 through 104-N, respectively. The components may represent, for example, sets of orthogonal frequency division multiplexed (OFDM) sub-carriers. Pilot tones 103 are present at either end of the side band 102, and pilot tones 105 are present at either end of the side band 104. Additional pilot tones (not shown) may be present elsewhere in the portion of the frequency spectrum shown. The pilot tones 103, 105 correspond to selected OFDM reference tones, and may be used to determine the presence of interference. While the unmodulated pilot tones 103, 105 could be placed anywhere across the DAB spectrum (or eliminated entirely), the main advantage of positioning them on the side is to utilize them as reference points in the DQPSK de-modulation across the frequency domain.

The present invention utilizes a periodic signature sequence, such as a Barker code with a very low side-lobe, that is transmitted over certain number of bins in a DAB system in both the upper and lower sides of the DAB signal. Once the codes are assigned to specific bins known to the receiver, any shift from that location due to frequency offset errors can be estimated and compensated for by the frequency offset algorithm. A constant frequency offset is applied to the receiver local oscillator in the beginning of the call set-up to compensate for course frequency offset of the determined number of integer bins. Thus, the location of the Barker signature sequence identifies the amount of frequency offset (in terms of the number of bins).

According to a further feature of the present invention, the same periodic signature sequence, such as a Barker code, is also used for interleaver synchronization. The beginning of the interleaver block is identified by the OFDM frame that contains the Barker sequence. It is again noted that an interleaver block contains L OFDM frames, and the last frame of the interleaver block carries the Barker sequence, in accordance with one implementation of the present invention. Thus, upon correlation of the received signal at the DAB receiver, the location of the Barker sequence identifies the beginning of an interleaver block.

Thus, the signature frame identifies the beginning of an interleaver block and the location of the signature sequence within the signature frame provides for the amount of frequency offset. To make the frequency offset algorithm more robust against channel artifacts and the impact of the first adjacent interference, a complementary Barker code sequence can be intermittently used on both upper and lower sides of the DAB signal for both time and frequency diversity purposes. In addition, if one of the side bands is lost or corrupted by the upper or lower first adjacent, the other side band detects and estimates the frequency offset error independently.

It is noted that the present invention assumes that a partial frequency offset estimation algorithm has compensated for the partial frequency offset, for example, by estimating the phase rotation of the cyclic prefix portion of the OFDM frame in the time domain.

Figure 2:
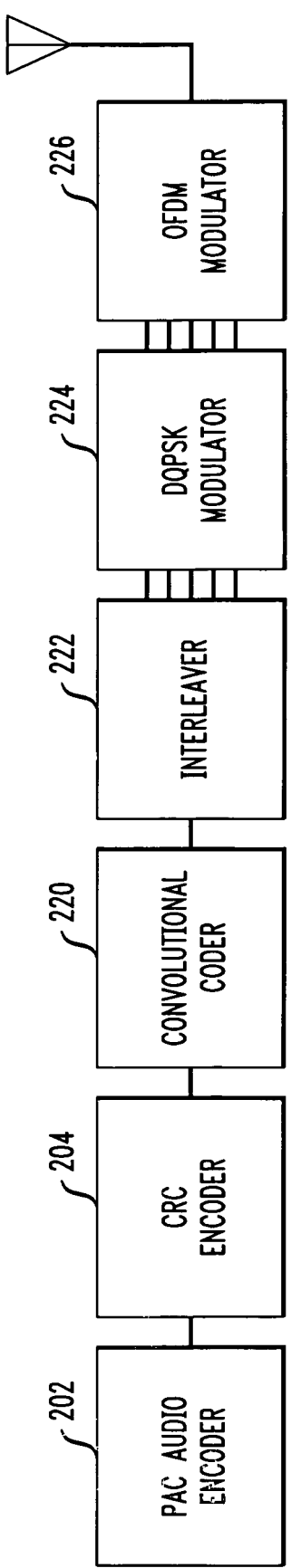
FIG. 2 is a schematic block diagram of a transmitter in an exemplary hybrid in-band on-channel digital audio broadcasting system in which the present invention may be implemented.

FIG. 2 shows an exemplary FM HIBOC DAB system 200 in which the invention may be implemented. The system 200 includes a transmitter and a receiver. It should be noted that FIG. 2 shows only the digital portion of the system, i.e., the portions associated with generation and processing of the digital signals. Additional conventional processing elements may be used to process the analog signals. A PAC audio coder 202 generates an encoded audio signal, for example, at a bit rate of 96 kbps using the audio compression techniques-described, for example, in D. Sinha, J. D. Johnston, S. Dorward and S. R. Quackenbush, "The Perceptual Audio Coder," in Digital Audio, Section 42, pp. 42-1 to 42-18, CRC Press, 1998, incorporated by reference herein. The encoded audio bit stream is applied to a CRC encoder 204, which M generates CRC bits in a conventional manner using a CRC error detecting block code. CRC is an example of one type of "inner code" that may be used in the system 200. Other possible inner codes include, for example, Reed-Solomon (RS) codes, Bose-Chadhuri-Hocquenghem (BCH) codes, and other block codes.

As shown in FIG. 2, the FM HIBOC DAB system 200 also includes a convolutional coder 220, such as a complementary punctured pair convolutional (CPPC) coder for coding the audio bitstream in accordance with well-known CPPC techniques. In addition, the FM HIBOC DAB system 200 includes an interleaver 222, a DQPSK modulator 224, and an OFDM modulator 226. The convolutional coding in coder 220 is an example of a type of "outer code" that may be used in the system 200. Other types of outer codes may also be used, including block or convolutional codes, so-called "turbo" codes, and coding associated with trellis coded modulation. The modulated output of the OFDM modulator 226, which corresponds to the digital side bands 102 and 104, is transmitted through an FM broadcast channel 230 to a receiver (not shown). The DQPSK modulator 224 processes the interleaved bit stream to generate two bits for each QPSK symbol, which are then mapped to the appropriate sub-carrier by the OFDM modulator 226. For a more detailed discussion of a conventional orthogonal frequency division multiplexing (OFDM) system, see, for example, W. Y. Zou and Y. Wu, "COFDM—An Overview," IEEE Trans. Broadcasting, Vol. 41, No. 1, 1–8 (March 1995) or J. A. C. Bingham, "Multicarrier Modulation for Data Transmission: An Idea Whose Time Has Come," IEEE Comm., 5–14 (May 1990), each incorporated by reference herein.

As previously indicated, the interleaver 222 utilizes a periodic signature sequence, such as a Barker code with a very low side-lobe, that is transmitted over a certain number of bins in both the upper and lower sides of the DAB signal. For example, the last column of the interleaver 222 can contain a Barker sequence.

Figure 3:
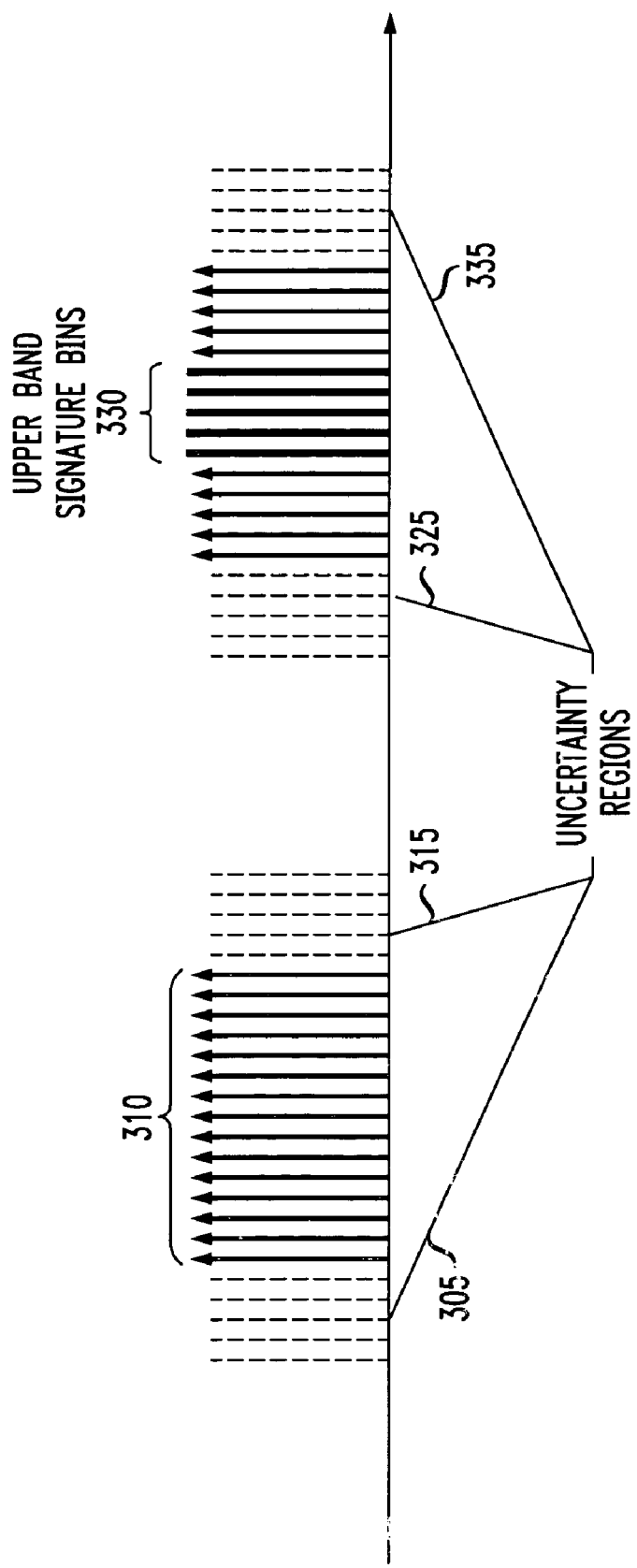
FIG. 3 illustrates the format of a signature OFDM frame in accordance with the present invention.

FIG. 3 illustrates the format of a signature OFDM frame in accordance with the present invention. It is noted that the n bins that carry the Barker sequence are referred to as the signature bins 310, 330 and the OFDM frames that contain the signature bins are referred to as signature frames. If the maximum frequency offset is M, then the frequency offset algorithm utilizes a search window of size n+2M, and attempts to maintain the Barker sequence in the center of the search window. As shown in FIG. 3, the present invention utilizes four uncertainty regions 305, 315, 325, 335 of size M, where M is the group of bins (frequencies) that can fall out of the receiver processing range for maximum positive and negative frequency offset values.

Frequency Offset Estimation Algorithm

The FM HIBOC DAB system 200 shown in FIG. 2 sends a Barker sequence over a signature frame every L data frames on each side band. The number L is generally equivalent to the number of OFDM frames that can fill the memory of the interleaver 222. In addition, the transmission of the signature sequence on one side band is delayed from the other by L/2 data frames for diversity purposes. This technique can generally double the speed of the algorithm and also increases the robustness as a result of the signature codes in both time and frequency domains.

Figure 4:
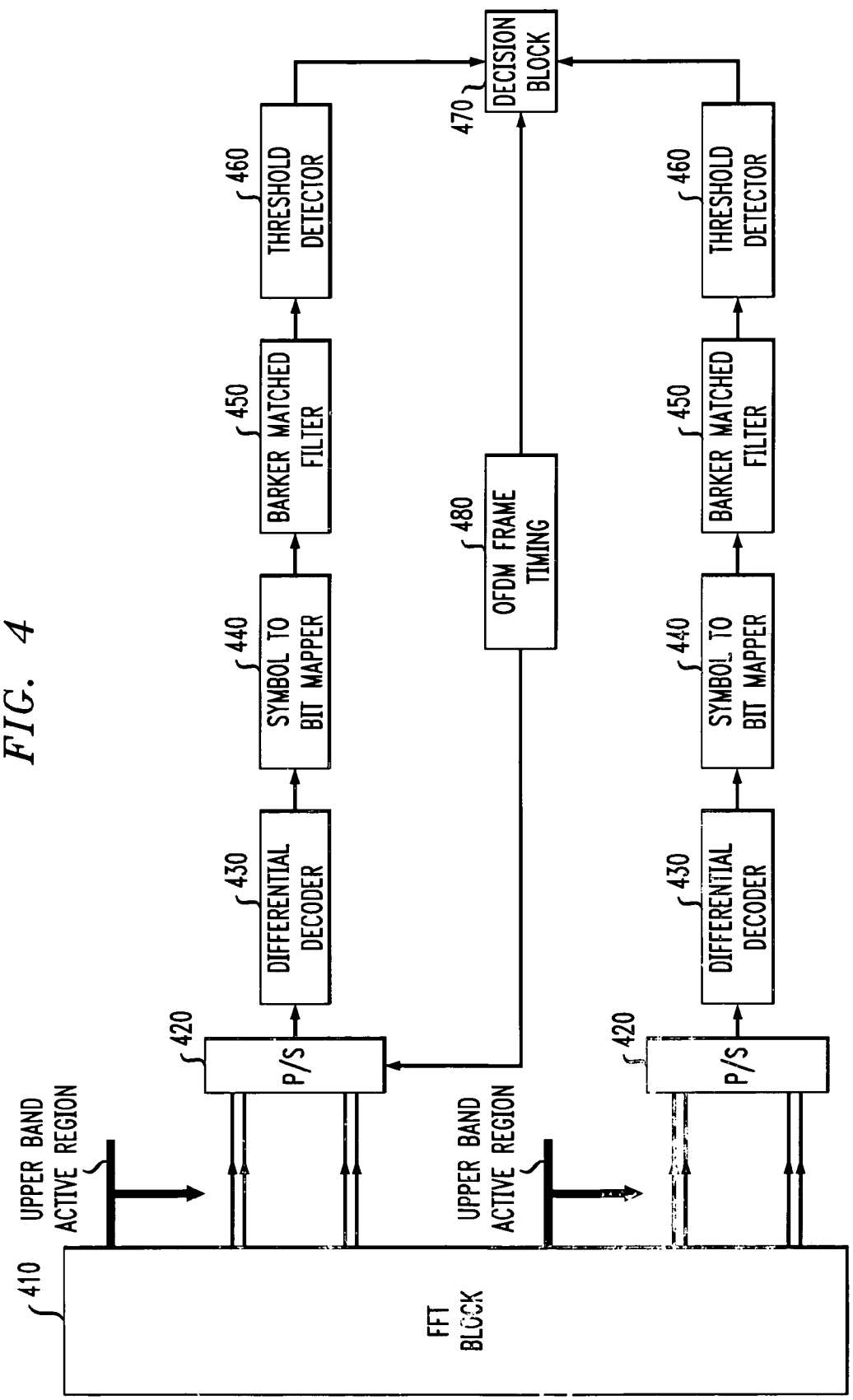
FIG. 4 is a schematic block diagram of an exemplary receiver in a hybrid in-band on-channel digital audio broadcasting system in which the present invention may be implemented.

FIG. 4 is a schematic block diagram of the synchronization-frequency offset estimation components for a receiver 400 in a DQPSK-OFDM system, in accordance with the present invention. At the transmitter 200, the Barker sequence is mapped to the OFDM signature bins 310, 330 that do not belong to the uncertainty regions 305, 315, 325, 335 (FIG. 3). Thus, the Barker sequence bins are processed by the receiver regardless of the amount of frequency offset. For example, if the maximum frequency offset, M, is established with a value of 10 at the receiver, the 10 inner and out bins on each side band are not used to carry the Barker sequence because they might be missed by the receiver for certain frequency offset values.

The receiver 400 processes the outputs N−M to N+n+M and −N+M to −N−n−M, of the FFT block 410, where the outputs N−M to N+n+M and 5−N+M to −N−n−M, correspond to the upper and lower uncertainty regions for the signature bins in absence of any frequency offset. If the received frequency domain signal is shifted by a frequency offset equal to an integer multiple of the frame rate before the FFT operation, this frequency shift in frequency domain is translated to a time shift by an integer number of symbols at the FFT output. In other words, the signal pattern at the output of the FFT block 410 will be shifted by ±ΔN to the left or to the right depending on the sign of the frequency offset.

In a signature frame, the Barker sequence is mapped on signature bins ±N±n, as shown in FIG. 3. While processing a signature frame (every L frames) (from among all the arriving frames within an interleaver block), the Barker matched filter 450, having the length of 2n−1 will produce a peak upon the arrival of the 2(N+n)'th demodulated bit and 2(−N−n)'th demodulated bit in absence of any frequency offset. For a frequency offset of ±ΔN bins, the autocorrelation peak will be shifted from this reference bit to the 2(±N±n±ΔN)'th bit position. Any shift from this reference bit is calculated and the corresponding frequency offset is determined by the receiver 400.

As shown in FIG. 4, the receiver 400 also includes a differential decoder 430, a symbol to bit mapper 440, the Barker matched filter 450, a thresheld detector 460 for identifying correlated peaks, and a decision block 470. For a discussion of these elements, see, for example, R. A. Scholtz, "Frame Synchronization Techniques," I.E.E.E. Trans. Comm., Vol. COM-28, No. 8, 1204–1212, incorporated by reference herein.

The OFDM frame synchronization must be performed prior to the frequency offset estimation, and the frame timing should be available to the parallel to serial converter 420 and the decision block 470 in the frequency offset estimation system. In addition, the automatic gain control output from the receiver AGC block should be used for to establish a threshold in the threshold detector blocks 460. It is noted that the present invention can utilize a maximum likelihood approach by taking the largest samples of the Barker matched filter outputs in each frame and take the strongest of all these maximums over one interleaver block. Under this condition, no threshold setting by the receiver AGC circuitry is required.

The present invention thus provides a frequency offset estimation algorithm that estimates the frequency offset of the received signal from the local oscillator within the OFDM frame rate. The frequency offset algorithm estimates the phase rotation within one OFDM frame as a result of the frequency offset of the received signal. For frequency offset values within the OFDM frame rate, the signal phase rotation due to the frequency offset cannot exceed 2π and as such, the exact offset can be expressed as follows:

$$\Delta f = \frac{\Delta\Theta \cdot R_f}{2\Pi}.$$

It is to be understood that the embodiments and variations shown and described herein are merely illustrative of the principles of this invention and that various modifications may be implemented by those skilled in the art without departing from the scope and spirit of the invention.

We claim:
1. A method for estimating the frequency offset in an OFDM communication system, comprising the steps of:
   allocating certain locations in an OFDM frame to a signature sequence;
   transmitting said signature sequence with data to a receiver, wherein said data and said signature sequence are encoded using a differential encoding performed in frequency; and estimating the frequency offset at said receiver by determining whether a correlated peak associated with said signature sequence is in an expected location.

2. The method of claim 1, wherein said signature sequence is stored in the last column of a block interleaver.

3. The method of claim 1, wherein said signature sequence is transmitted over a number of bins in upper and lower side bands of the digital signal.

4. The method of claim 1, further comprising the step of correcting said estimated frequency offset using feedback techniques.

5. The method of claim 1, further comprising the step of correcting said estimated frequency offset using forward error correction techniques.

6. The method of claim 1, wherein said signature sequence is transmitted every L data frames on each side band, where L is generally the number of OFDM frames that can fill the interleaver memory.

7. The method of claim 1, wherein said signature sequence is transmitted every time an interleaver memory is full.

8. The method of claim 1, further comprising the step of delaying the transmission of said signature sequence on one side band from the other side band.

9. The method of claim 1, further comprising the step of maintaining said signature sequence in the center of a search window.

10. The method of claim 1, wherein the signature sequence is a Barker sequence.

11. The method of claim 1, wherein the signature sequence is a Barker sequence with a very low side-lobe.

12. A method for estimating the frequency offset in an OFDM communication system, comprising the steps of:
receiving a digital signal, wherein said received digital signal contains a signature sequence in an expected location, wherein said received digital signal is encoded using a differential encoding performed in frequency;
correlating said received digital signal using a filter matched to said signature sequence; and
identifying whether a correlated peak associated with said received digital signal is an expected location.

13. The method of claim 12, wherein said signature sequence is stored by a transmitter in the last column of a block interleaver.

14. The method of claim 12, wherein said signature sequence is received over a number of bins in upper and lower side bands of the digital signal.

15. The method of claim 12, further comprising the step of correcting said estimated frequency offset using feedback techniques.

16. The method of claim 12, further comprising the step of collecting said estimated frequency offset using forward error correction techniques.

17. The method of claim 12, wherein said signature sequence is received every L data frames on each side band, where L is generally the number of OFDM frames that can fill an interleaver memory.

18. The method of claim 12, wherein said signature sequence is received every time a de-interleaver memory is full.

19. The method of claim 12, wherein the signature sequence on one side band is delayed from the other side band.

20. The method of claim 12, further comprising the step of maintaining said signature sequence in the center of a search window.

21. The method of claim 12, wherein the signature sequence is a Barker sequence with a very low side-lobe.

22. A method for synchronizing interleavers in an OFDM communication system, comprising the steps of:
allocating certain locations in an OFDM frame to a signature sequence;
transmitting said signature sequence with data to a receiver, wherein said data and said signature sequence are encoded using a differential encoding performed in frequency; and
identifying a beginning of an interleaver block based on a location of a correlated peak associated with said signature sequence.

23. The method of claim 22, wherein said signature sequence is stored in the last column of a block interleaver.

24. The method of claim 22, wherein said signature sequence is transmitted over a number of predefined bins in both the upper and lower sides of the digital signal.

25. The method of claim 22, wherein said signature sequence is received every L data frames on each side band, where L is generally the number of OFDM frames that can fill an interleaver memory.

26. The method of claim 22, wherein said signature sequence is transmitted every time an interleaver memory is full.

27. The method of claim 22, further comprising the step of delaying the transmission, of said signature sequence on one side band from the other side band.

28. The method of claim 22, wherein the signature sequence is a Barker sequence with a very low side-lobe.

29. A receiver in an OFDM communication system for receiving a digital signal containing a signature sequence in an expected location, comprising:
a filter matched to said signature sequence for correlating said received digital signal, wherein said received digital signal is encoded using a differential encoding performed in frequency; and
a frequency offset estimator that identifies whether a correlated peak associated with said received digital signal is an expected location.

30. A receiver in an OFDM communication system, comprising:
means for receiving a digital signal having a signature sequence in certain locations, wherein said received digital signal is encoded using a differential encoding performed in frequency;
a filter matched to said signature sequence for correlating said received digital signal; and
an interleaver synchronizer that identifies a beginning of an interleaver block based on a location of a correlated peak associated with said signature sequence.

* * * * *

UNITED STATES PATENT AND TRADEMARK OFFICE
CERTIFICATE OF CORRECTION

PATENT NO. : 6,987,752 B1
DATED : January 17, 2006
INVENTOR(S) : Sarraf et al.

It is certified that error appears in the above-identified patent and that said Letters Patent is hereby corrected as shown below:

Column 5,
Line 60, before "-N+M to -N-n-M" and after "and" delete "5".

Column 7,
Line 53, before "said estimated frequency" and after "of" replace "collecting" with -- correcting --.

Column 8,
Line 34, before "of said signature" and after "transmission" delete ",".

Signed and Sealed this

Second Day of May, 2006

JON W. DUDAS
*Director of the United States Patent and Trademark Office*